(12) United States Patent

MacDowell et al.

(10) Patent No.: US 12,679,969 B2

(45) Date of Patent: Jul. 14, 2026

(54) METHOD OF THICKENING PHENOLIC RESIN AND USE THEREOF TO FORM VEHICLE COMPONENTS

(71) Applicant: CSP INNOVATIONS, INC., Auburn Hills, MI (US)

(72) Inventors: Hugh MacDowell, Auburn Hills, MI (US); Michael Hiltunen, Auburn Hills, MI (US); Steven Prascius, Auburn Hills, MI (US)

(73) Assignee: CSP INNOVATIONS, INC., Auburn Hills, MI (US)

( * ) Notice: Subject to any disclaimer, the term of this patent is extended or adjusted under 35 U.S.C. 154(b) by 555 days.

(21) Appl. No.: 18/035,945

(22) PCT Filed: Oct. 29, 2021

(86) PCT No.: PCT/US2021/057211

§ 371 (c)(1),
(2) Date: May 9, 2023

(87) PCT Pub. No.: WO2022/103596

PCT Pub. Date: May 19, 2022

(65) Prior Publication Data

US 2023/0407081 A1      Dec. 21, 2023

Related U.S. Application Data

(60) Provisional application No. 63/112,753, filed on Nov. 12, 2020.

(51) Int. Cl.

| | |
|---|---|
| C08L 61/12 | (2006.01) |
| C08J 3/21 | (2006.01) |
| C08K 7/14 | (2006.01) |
| H01M 50/227 | (2021.01) |
| C08K 3/22 | (2006.01) |

(52) U.S. Cl.

CPC ................. C08L 61/12 (2013.01); C08J 3/21 (2013.01); C08K 7/14 (2013.01); H01M 50/227 (2021.01); *C08J 2361/12* (2013.01); *C08K 2003/222* (2013.01)

(58) Field of Classification Search

CPC ... C08L 61/12; C08L 61/06; C08J 3/21; C08J 2361/12; C08K 7/14; C08K 2003/222; C08K 5/0091; C08K 2003/2227; C08K 2003/387; C08K 3/26; H01M 50/227

USPC .............................................................. 524/6

See application file for complete search history.

(56) References Cited

U.S. PATENT DOCUMENTS

| | | | |
|---|---|---|---|
| 4,794,051 A | 12/1988 | Gupta | |
| 5,015,529 A | 5/1991 | Gupta | |
| 5,066,693 A | 11/1991 | Gupta | |
| 5,243,015 A | 9/1993 | Hutchings et al. | |
| 2005/0281999 A1* | 12/2005 | Hofmann .................. | B32B 5/18 |
| | | | 428/319.3 |
| 2007/0160822 A1* | 7/2007 | Bristow .................. | B29C 43/52 |
| | | | 264/322 |
| 2015/0065756 A1* | 3/2015 | Suzuki .................. | F16D 69/026 |
| | | | 568/780 |
| 2015/0191623 A1 | 7/2015 | Kaneiwa et al. | |

FOREIGN PATENT DOCUMENTS

| | | |
|---|---|---|
| CN | 108841135 A | 11/2018 |
| EP | 0217370 A2 | 4/1987 |

OTHER PUBLICATIONS

EESR issued in corresponding European Appln. No. 21892572.5, dated Oct. 10, 2024.

Int'l Search Report for PCT/US2021/057211, dated Feb. 23, 2022.

\* cited by examiner

*Primary Examiner* — Hannah J Pak

(74) *Attorney, Agent, or Firm* — Quinn IP Law

(57) ABSTRACT

A method of building viscosity in a sheet molding composition is provided that includes a thickening agent of at least one of magnesium oxide, magnesium hydroxide, calcium oxide, calcium hydroxides, zinc oxide, borates, aluminum ion chelates, aluminum trihydrate, polyphosphate, epoxides being mixed into a phenolic resin liquid or solution that includes novolac resin. An initial viscosity results for the mixture. The viscosity builds from the initial viscosity to 36 hours, from 36 to 142 hours, and then from 142 hours to 176 hours to define a slope ratio of viscosities in these time ranges of 1.5-8:1:−0.4-2 and a having terminal viscosity as measured at 176 hours. Alternatively, the initial viscosity is between 500 and 50,000 centiPoise (cP) and at 24 hours thereafter builds to between 1 million to 50 million cP, and the terminal viscosity thereafter of between 10 million and 200 million cP.

18 Claims, 3 Drawing Sheets

METHOD OF THICKENING PHENOLIC RESIN AND USE THEREOF TO FORM VEHICLE COMPONENTS

RELATED APPLICATIONS

This application claims priority benefit of U.S. Provisional Application Ser. No. 63/112,753 filed Nov. 12, 2020; the contents of which are hereby incorporated by reference.

FIELD OF THE INVENTION

The present, invention generally relates to phenolic resin compositions and in particular to a phenolic resin composition that is thickened to operate as sheet molding composition (SMC).

BACKGROUND OF THE INVENTION

Articles formed from sheet molding compounds (SMCs) have intrinsic physical properties that are largely dictated by the inherent properties of the cured resin matrix and the interaction between the matrix and encapsulated fiber fillers such as glass or carbon. As a result, the options available to achieve higher strength in an SMC article are somewhat limited and invariably involve a combination of greater cost and greater complexity of manufacture.

Thickeners have been regularly added to sheet molding compounds (SMC) or bulk molding compounds (BMC) in order to facilitate handling and adhesion between low molecular weight polymeric resin and fiber components during mold filling. The low molecular weight polymeric resins are increased in viscosity through polymerization. Typical of these low molecular weight polymeric resins are unsaturated polyester and vinyl ester. In the case of an unsaturated polymeric resin, the addition of di- or polyfunctional species are cross-linked to form a branched network of polymer chains.

One type of thickener includes alkali earth oxides and hydroxides. Of these thickeners, magnesium oxide is the most commonly used of such thickeners. Generally, it is believed that alkali earth oxides and hydroxides form ionic bonds with functional moieties of polymeric resins present. U.S. Pat. No. 6,780,923B2 is exemplary of these efforts. This type of thickener is hygroscopic and as a result, seasonal humidity and temperature changes can modify thickened SMC properties.

There is growing regulatory demand for lightweight vehicle components that also have improved fire retardancy. Exemplary of these standards is the European Union enacted EN 45545-2 safety standard. Key parameters that are measured for compliance with the EN 45545-2 standard include flame spread, ignitability, heat release, smoke opacity and toxicity. Having passed the tests, adhesives, sealants, and products for molding and protecting electronics and other structural components are given approval according to EN 45545-2 for use in trains.

Phenolic resins demonstrate higher char yields than other plastic materials when exposed to temperatures above their point of decomposition. In an inert atmosphere at high temperatures of 300 to 1,000° C., phenolic resin form vitreous carbon. Traditional vehicle applications that benefit from the formation of a thin vitreous carbon are brake and clutch components that experience friction induced heating.

Water is produced during synthesis of phenolic resole resins and used as a diluent. Varying amounts of water content in phenolic resole resins can change the curing behavior, the viscosity, and therefore the maturation of SMC based on a phenolic resole resin with a moisture content up to 30 total weight percent without regard for fillers or fibers. in contrast, polyester based. SMCs typically have moisture contents of up to 0.2 total weight percent. This high moisture content can complicate viscosity build in phenolic resin SMCs, yet SMC molding requires controlled build of viscosities that begin at as low as 500-15,000 Centipoise (Cp) to a terminal viscosity of 100,000,000 Cp in a moldable SMC sheet.

Studies of phenolic SMC thickening have found some metal oxides and hydroxides, such as MgO to provide unfavorable thickening curves due to slow thickening rates. Deng, Jinglan, et al. "Study on the Thickening Mechanism of Phenolic SMC." ICCM Proceedings, paper ID-1458, Dec. 7, 2019.

Thus, there exists a need for the formulation of a thickened phenolic SMC composition and a method of molding with a thickened phenolic SMC.

SUMMARY OF THE INVENTION

A method of building viscosity in a sheet molding composition is provided that includes a thickening agent of at least one of magnesium oxide, magnesium hydroxide, calcium oxide, calcium hydroxides, zinc oxide, borates, aluminum ion chelates, aluminum trihydrate, polyphosphate, epoxides being mixed into a phenolic resin liquid or solution that includes novolac resin. An initial viscosity results for the mixture. The viscosity builds from the initial viscosity to 36 hours, from 36 to 142 hours, and then from 142 hours to 176 hours to define a slope ratio of viscosities in these time ranges of 1.5-8:1:-0.4-2 and a having terminal viscosity as measured at 176 hours. Alternatively, the initial viscosity is between 500 and 50,000 centiPoise (cP) and at 24 hours thereafter builds to between 1 million to 50 million cP, and the terminal viscosity thereafter of between 10 million and 200 million cP.

BRIEF DESCRIPTION OF THE DRAWINGS

The present invention is further detailed with respect to the following drawings. These figures are not intended to limit the scope of the present invention but rather illustrate certain attributes thereof.

DESCRIPTION OF THE INVENTION

Figure 1:
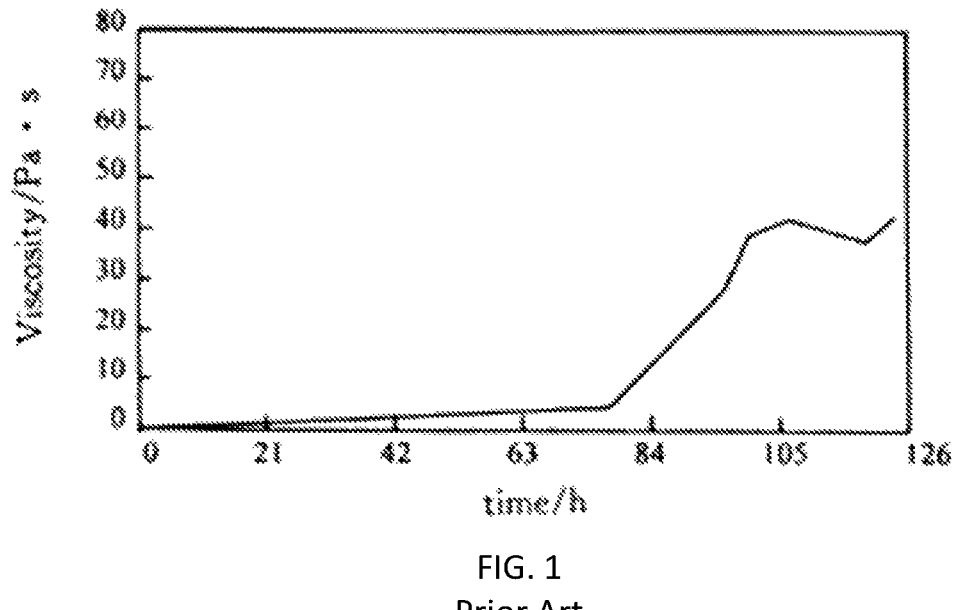
FIG. 1 is a prior plot of viscosity build as a function of time for a phenolic SMC thickened with MgO.

In accordance with the present invention, magnesium oxide particulate is added into an uncured phenolic resin sheet molding compound (SMC) under conditions suitable for the rapid and stable build of viscosity. The present invention, in contrast FIG. 1, provides a rapid initial build of viscosity over the first 24 to 36 hours that then builds at a slower rate for several days thereafter. In some inventive embodiments, the time zero viscosity is between 500-50,000 cP, 24 hours viscosity are between 1 million to 50 million cP, and plateau viscosity thereafter is between 10 million and 200 million cP.

Figure 2:
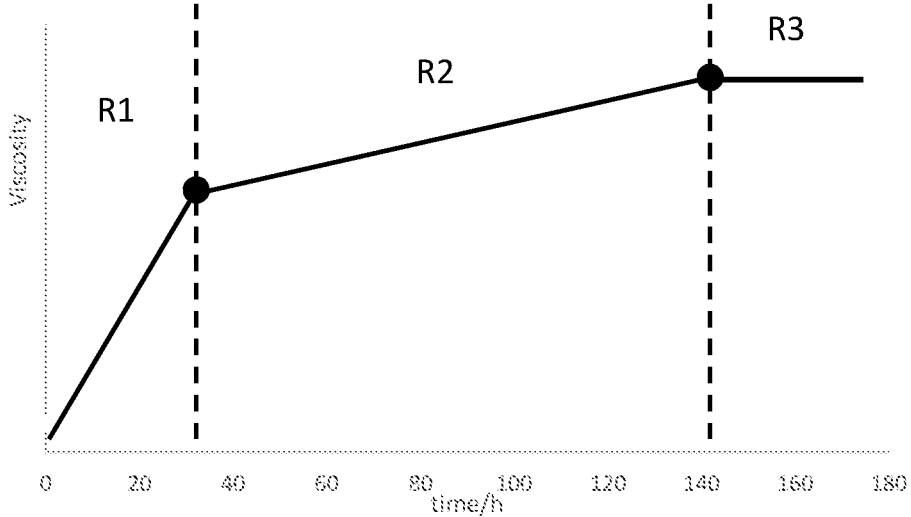
FIG. 2 is a generic plot of the three viscosity build regions as a function of time for inventive phenolic SMC thickened with MgO.

In still other inventive embodiments, the thickening agent is compounded in an inventive formulation to have a viscosity build in three separate regions as shown in FIG. 2. The slopes of the viscosity build from mixing to 36 hours, from 36 to 142 hours, and from 142 hours to 176 hours define a ratio of 1.5-8:1:-0.4-2. In some embodiments, the viscosity build is complete at 48 hours and the resulting filler and fiber loaded SMC is molded. The slopes being determined by least square method linear best fit. An inventive SMC composition has predictable development of viscosity and is readily adjusted to a desired viscosity to account for ambient conditions, and viscosity increases associated with fiber additives, particulate additives, low profile additives, and combinations of any of the aforementioned. As a result, an article is formed from an inventive SMC that molds well compared to a conventional phenolic SMC article while achieving superior fire retardancy compared to a conventional polyester-based SMC. The properties of an inventive article are also attractive relative to aluminum for the formation of vehicle body and exterior panels. Typical molding cycle times with an inventive SMC range from 45 to 180 seconds.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

The present invention is functional as a thickened phenolic resin-based SMC. Phenolic resins operative herein include novolac-phenolic resins, resol-phenolic resin, benzyl ether resins, urea-formaidehyde, melamine resins, and combinations thereof. The formation of benzyl ether resins are detailed in U.S. Pat. No. 3,495,797. In some inventive embodiments, a mixture of novolac- and resol-phenolic resins are present in the SMC.

Phenols for use in producing the phenolic resin operative in an inventive SMC composition include phenol, cresol, xylenol, ethylphenol, propylphenol, catechol, resorcin, hydroquinone, bisphenol-A, bisphenol-F, and combinations thereof. While phenol is prototypical, it is appreciated the other phenols modify functionality, steric effects, and hydrophobicity relative to phenol.

Aldehydes for use in producing the phenolic resin operative in an inventive SMC composition include formaldehyde, paraformaldehyde, benzaldehyde, and combinations thereof. While formaldehyde is prototypical, it is appreciated the other aldehydes modify functionality, steric effects, and hydrophobicity relative to formaldehyde.

Resol phenolic resins, as the term is used herein, are defined to be formed with a pH basic catalyst and, usually but not necessarily, a molar excess of formaldehyde relative to phenol; while in other embodiments, the phenol is in excess relative to formaldehyde. Resol phenolic resins are also conventionally formed at neutral pH and later catalyzed with acid catalysts to a crosslinked solid. The typical number average molecular weight (Mn) of a resol phenolic resin is between 200 and 750. Resol phenolic resins are supplied as liquids or in aqueous or alcoholic solutions with resulting viscosities from 50 to 50,000 Cps, or as solids in the form of lumps, granules, or fine powders. In particular inventive embodiments, the resol phenolic resin is provided as a solution.

Novolac phenolic resins, as the term is used herein, are defined to be formed with an acidic catalyst and a molar excess of phenol to formaldehyde with water being the condensation by-product with a degree of branching to form a mixture of polymers of different sizes and structures.

While not intending to be bound to a particular theory, novolac phenolic resin appears to improve the moldability of an SMC based on limiting resin separation from reinforcing fibers dispersed therein. Additionally, novolac phenolic resin is operative in the present invention adjust the melt viscosity, the cure rate, or a combination thereof of the resulting SMC. Without intending to be bound by a particular theory as the resol and novolac phenolic resins have different cure mechanisms, the inclusion of both types allows one to create viscosity builds as detailed with respect to FIG. 2. Factors relevant in controlling melt viscosity include minimal viscosity reached during curing, cure rate as it pertains to gel time, the amount of Novolac curing agent present, water content, the monomers forming each resins, and others. As a result, a mixture of resol and novolac phenolic resins is particularly useful in formulating an SMC, subject to the proviso that at least one of the phenolic resins is present as a liquid or a solution.

Novolac resins require the presence of a curing agent to complete cure, and as a result the industry commonly refers to novolac resins as two-stage products. The most common phenolic resin curing agent is hexamethylenetetramine (HMTA) that is used as powder dispersed throughout the resin that is activated by heating. A bonding network of aromatic phenolics accounts for the hardness and the heat resistant properties for the resulting articles formed from the SMC. The curing agent is provided premixed with the resin or added as a separate component.

The Mn of novolac phenolic resin operative in the present invention is between 250 and 1200. Novolac phenolic resins are supplied as liquids or in solvents aqueous or alcoholic with resulting viscosities from 50 to 50,000 cps, or as solids in the form of lumps, granules, or fine powders. In some inventive embodiments, the novolac phenolic resin is present as a powder dispersed in a liquid or solution resol phenolic resin.

Through the addition of reinforcing fibers, hollow glass microspheres, or a combination thereof, a lightweight and strong article is formed that is readily exploited in to form components of land vehicles, in aerospace, wind turbines, HVAC and electrical components, and marine settings with fire retardancy and chemical resistance. Mass production land vehicle body and exterior parts formed according to the present invention offer manufacturing, weight savings, and durability improvements relative to both conventional polyester SMC and aluminum.

As detailed herein, volume percent is measured based on a fully formulation SMC composition inclusive of fillers and additives prior to cure. It is appreciated that volume percent and weight percent are readily interchanged using the density of a given component. Additionally, as the dimensional change upon cure is typically less than 1% linear percent, volume percent is also readily calculated from cured articles.

As detailed herein, polymer molecular weight is number average molecular weight (Mn).

According to the present invention, a fully formulated SMC composition is 5 to 70 volume percent fiber content. The fiber being glass only, carbon only, a mixture of glass with at least one of carbon fiber, aramid fiber, or cellulosic fiber or a mixture of any of the aforementioned fibers. Cellulosic fiber illustratively including hemp, sisal, cane, bamboo, jute, straw, silk, straw, palm frond, coconut husk, coconut fiber; and combinations thereof. Typical lengths of filler fibers used in the present invention typically range from 0.5 to 5 centimeters (cm). It is appreciated that continuous, directionuse of such filler fibers are also operative in the current invention. The diameters of filler fibers are appreciated to vary widely based on commercial sources with glass filler fibers having typical diameters of 0.03 to 0.5 millimeters (n); carbon filler fibers having typical diameters of 0.005 to 0.1 mm; and natural filler fibers having typical diameters of 0.01 to 0.3 mm. It should be appreciated that fiber dimensions outside of the aforementioned typical ranges exist and are intended to be within the scope of the present invention. It is also appreciated that cellulosic fibers of natural origin are readily treated to enhance bonding to the SMC matrix, such treatments are detailed in U.S. Pat. Pub. 2014/0329964.

The present invention includes at least one phenolic resin present from 70% by weight to 99 percent by total weight absent the inclusion of any inert fillers or fibers. To the extent that the phenolic resin is a novolac phenolic resin, the weight percent includes curing agent. Curing agents for novolac phenolic resins include ammonia, HMTA, trishydroxymethylaminomethane, and combinations thereof. Typical loadings of curing agent in a novolac phenolic resin range from 3 to 20 parts by weight of curing agent based on 100 parts by weight of the novolac pheolic resin.

A thickening agent to provide the viscosity profile of FIG. 2 is present from 0.5% by weight to 25 percent by total weight without regard for the additives, inert fillers, or fibers. A thickening agent operative herein illustratively include magnesium oxide; magnesium hydroxide; calcium oxide; calcium hydroxides; zinc oxide; borates; aluminum ion chelates; aluminum trihydrate; polyphosphates such hexametaphosphate, epoxides, and combinations thereof. In some inventive embodiments, the thickening agent is magnesium oxide. The thickening agent is typically present as a powder having particle sizes of between 0.1 and 490 microns. In some inventive embodiments, the thickening agent is a powder having particle sizes of between 1 and 30 microns. It is appreciated that the surface area of the thickening agent, where metal ions are available for bonding is an important factor. As a result, a lesser volume of smaller diameter thickening agent particles is able to provide the same viscosity build as a larger volume of larger diameter particles.

In some inventive embodiments, the mixture of novolac- and resol-phenolic resins are present in a weight ratio of between 0.1-2:1. In some inventive embodiments when a mixture of novolac- and resol-phenolic resins are present, the resins are both liquids. In other inventive embodiments, the novolac phenolic resin particles are dispersed in a liquid resol-phenolic resin.

Without intending to be bound to a particular theory, the magnesium ions of the thickener are able to each be chelated by at least two free hydroxyl groups of a phenolic resin to produce a viscosity as a function of time curve as seen in FIG. 2. The kinetics of region 1 of FIG. 2 are believed to be associated with initial chelation, while region 2 is association with secondary magnesium ion chelation. Region 3 kinetics are believed to be controlled by steric, consiraints completing the coordination sphere and moisture competition for chelation sites. The presence of novolac phenolic resins alone or in combination with resol phenolic resin is believed to explain the disparity in viscosity build between prior art FIG. 1 and generic inventive FIG. 2. In some inventive embodiments, the thickening agent is added as the final components to initiate viscosity build.

An inventive SMC formulation is prepared by adding a thickening agent powder to phenolic resin with mechanical mixing alone or in combination with heating to achieve viscous flowable mass. Various fillers, fibers, and additives are readily added prior to, during, or in some instance after addition of the thickening agent.

An inventive SMC composition is formulated in certain inventive embodiments to include between 2 volume percent and 33 volume percent of hollow glass microspheres. A glass microsphere has a mean diameter of between 10 and 55 microns. In certain embodiments, the glass microspheres are monodisperse, while in other embodiments; the microsphere sizes extend between 5 and 200 microns. It is appreciated that glass microspheres with higher crush strength are less likely to be damaged by sheer mixing associated with SMC formulation and flow pressures. A 16-micron glass microsphere is exemplary of those used in the following examples. It is appreciated that glass microspheres can be surface modified to enhance strength as detailed in U.S. Pat. No. 7,700,670 B2 or U.S. Pat. Pub. 2015/0376398 A1. The aforementioned volume loading of glass microspheres corresponds to 0.8 to 18 weight percent glass microspheres for conventional 16-micron diameter glass microspheres. It is appreciated that the inclusion of glass microspheres can reduce the density of a resulting article to below 1.6 grams/ cubic centimeter (g/cc), below 1.4 g/cc, and even as low as 0.9 g/cc. In some inventive embodiments, the glass microspheres are surface treated with coupling agents to create covalent bonds between the microspheres and a surrounding phenolic resin matrix. Coupling agents operative herein illustratively include γ-aminopropyltriethoxysilane (APTES), di(dioctylpyrophosphato) ethylene titanate, glutaraldehyde, and combinations thereof.

The SMC formulation in some inventive embodiments includes a particulate filler, distinct from the density reducing glass microspheres. Particulate fillers operative in such molding compositions illustratively include calcium carbonate, calcium silicate, alumina, silica, talcs, dolomite, clays, vermiculite, diatomaceous earth, graphite, metal and combinations thereof. Factors relevant in the choice of a particulate filler illustratively include pH, filler cost, resultant viscosity of flow properties, resultant shrinkage, surface finish weight, flammability, electrical conductivity, and chemical resistance of the thermoset formulation. Particulate filler typically accounts from 0 to 80 weight percent. Typical filler sizes are from 0.1 to 50 microns.

A mold release agent is typically provided to promote mold release. Mold releases include fatty acid salts illustratively including oleates, palmitates, stearates of metal ions such as sodium, zinc, calcium, magnesium, and lithium. A mold release is typically present from 0 to 5 total weight percent.

An epoxy resin is optionally provided to improve surface properties and dimensional stability of a resulting molded product. Epoxy resin are typically present from 0 to 20 total weight percent.

An elastomer is optionally provided to improve the elongation. An elastomer operative herein illustratively includes NBR, acryl rubber, styrene-butadiene rubber (SBR), butadiene rubber (BR), pheonoxy, polyvinyl butyral, polyvinyl alcohol, chloroprene rubber (CR), an elastomer containing an acrylic acid ester, and combinations thereof.

It is appreciated that the present invention optionally also incorporates additional additives illustratively including flame retardants, including intumescent flame retardents; plasticizers; colorants; and other processing additives conventional to the art.

Molding compositions of the present invention are well suited for the rapid production of molded composite material of a variety of articles illustratively including firewall barriers, bumper beams, automotive door intrusion beams, automotive door panel components, automotive hood and trunk lids, automotive load floor components, railcar components, aerospace components, vehicle battery box, and pick-up boxes, and various industrial and consumer product housings.

The present invention is further illustrated with respect to the following non-limiting examples.

EXAMPLE CONTROL 100 parts by weight of resol phenolic resin and 20 parts by weight of novolac phenolic resin containing 8% HMTA and having a 98 percent by weight of the novolac resin particles being less than 72 microns are mixed with 3 parts by weight of 5 micron calcium carbonate and 10 parts by weight of zinc stearate.

Example 1

Figure 3:
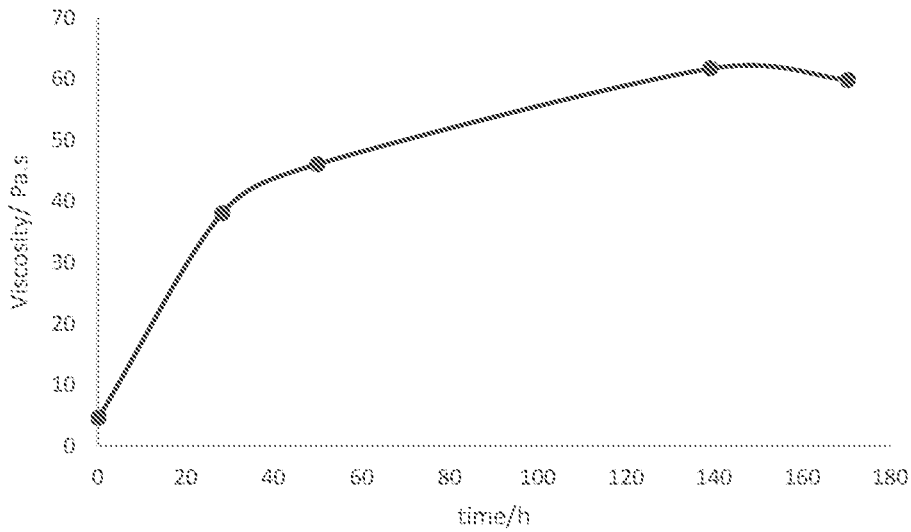
FIG. 3 is a plot of the viscosity as a function of time for an exemplary inventive phenolic SMC thickened with MgO.

To the base formulation of the Example Control, 4 parts by weight of 6 micron magnesium oxide is added. The process of the Example Control is repeated and generates a viscosity build as shown in FIG. 3.

Example 2-7

The present invention viscosity build (in centipoise) is provided as a function of paste temperature in degrees Celsius for six formulations denoted as 200630-8710.

| Day | Paste Temp (° F.) | 200630-8710-1 | 200630-8710-2 | 200630-8710-3 | 200630-8710-4 | 200630-8710-5 | 200630-8710-6 |
|-----|------|-------|-------|--------|--------|------------|-------|
| 0 | | 2,080 | 4,000 | 4,160 | 4,160 | 4,800 | 4,640 |
| 0.01 | | 2,080 | 4,000 | 4,000 | 4,640 | 5,440 | 5,760 |
| 1.18 | 73.9 | 2,560 | 4,960 | 8,320 | 38,080 | 7,280,000 | EEEE |
| 2.08 | 73.4 | 2,400 | 5,120 | 9,120 | 46,080 | 11,400,000 | |
| 5.80 | 72.5 | 2,880 | 6,240 | 11,040 | 61,760 | 32,200,000 | |
| 7.10 | 74.3 | 2,720 | 5,600 | 10,080 | 58,840 | 32,600,000 | |

TABLE 2

| Phenolic SMC Sample Formulation | | | |
|---|---|---|---|
| Mix # Mix Type | Ingredients | PBW (PHR) | 201019-8710-1 (g) |
| A | Resole (liquid) | 100.00 | 4,166.67 |
| | Novolac (powder) | 20.00 | 833.33 |
| | Zinc Stearate | 3.00 | 125.00 |
| Total A-side | | | |
| Total Resin | | 100.00 | 4,166.7 |
| Total | | 120.00 | 5,000.0 |
| B | | | 145.8 |
| | Magnesium Oxide | 3.50 | 145.8 |
| | | | 0.0 |
| | | | 0.0 |
| | | | 0.0 |
| | A:B | | 35.14 |

The SMC formulation had an initial temperature of 89° F. and a 15 minute temperature of 93° F. Viscosity of the SMC formulation was measured over a 4 day period as summarized in Table 3.

TABLE 3

| Viscosity Results | | | | | |
|---|---|---|---|---|---|
| Initial Temperature (F) | | | | | 89 |
| 15 Minute Temperature (F) | | | | | 93 |
| A-Side Water Content (%) | | | | | |

| Age | Date | Time | Day # | Paste Temperature | 201019-8710-1 (cP) |
|---|---|---|---|---|---|
| A-side | Oct. 18, 2019 | | | | |
| Initial | Oct. 18, 2019 | 1:57 PM | 0.00 | | 15,520 |
| 15 Minute | Oct. 18, 2019 | 2:12 PM | 0.01 | | 40,160 |
| Day 1 | Oct. 19, 2019 | | 0.00 | | |
| Day 2 | Oct. 20, 2019 | | 0.00 | | |
| Day 3 | Oct. 21, 2019 | 11:00 AM | 2.88 | | 62,600,000 |
| Day 4 | Oct. 22, 2019 | 6:11 PM | 4.18 | 74.5 | 66,200,000 |

Example 8

Phenolic SMC Formulation and Viscosity Results

A Part A is formed of 100 parts by weight of resol phenolic resin in liquid form and 20 parts by weight of novolac phenolic resin as a powder are mixed with 3 parts by weight of zinc stearate as a mold release agent. The Part A has 40% glass fiber by weight. A Part B of 3.5 parts by weight of magnesium oxide particulate is added into the Part A uncured phenolic resin sheet molding compound (SMC) under conditions suitable for the rapid and stable build of viscosity. Table 2 summarizes the parts of the phenolic SMC sample formulation.

Example 9

Variations in Phenolic Powders and Molding Performance

Three different SMC formulations of Part A with various amounts of phenolic powders were made. As summarized in table 4 three different Part A are formed of 100 parts by weight of resol phenolic resin in liquid form and the following: 20 parts by weight of novolac 1 phenolic resin, novolac 2 phenolic resin, and resole all as a powder are mixed with 3 parts by weight of zinc stearate as a mold release agent. A Part B of 3.5 parts by weight of magnesium oxide particulate is added into each of the Part A uncured phenolic resin sheet molding compound (SMC) under conditions suitable for the rapid and stable build of viscosity. Table 4 summarizes the parts of the three different phenolic SMC sample formulations.

9

10

TABLE 4

| Various Phenolic Powder Formulations | | | | | | |
|---|---|---|---|---|---|---|
| Mix # | | PBW | 200909-8710-1 | PBW | 200909-8710-2 | 200909-8710-3 |
| Mix Type | Ingredients | | | | | |
| A | Resole Resin (liquid) | 100.00 | 2,083.33 | 100.00 | 2,083.33 | 100.00 2,083.33 |
| | Novolac 1 (powder) | 20.00 | 416.67 | 0.00 | 0.00 | 0.00 0.00 |
| | Novolac 2 (powder) | 0.00 | 0.00 | 20.00 | 416.67 | 0.00 0.00 |
| | Resole (powder) | 0.00 | 0.00 | 0.00 | 0.00 | 20.00 416.67 |
| | Zinc Stearate | 3.00 | 62.50 | 3.00 | 62.50 | 3.00 62.50 |
| Total A-side | | | | | | |
| Total Resin | | 100.00 | 2,083.3 | 100.00 | 2,083.3 | 100.00 2,083.3 |
| Total | | 120.00 | 2,500.0 | 120.00 | 2,500.0 | 120.00 2,500.0 |
| B | | | 72.9 | | 72.9 | 76.9 |
| | Magnesium Oxide | 3.50 | 72.9 | 3.50 | 72.9 | 3.50 72.9 |
| | | | 0.0 | | 0.0 | 0.00 4.0 |
| | | | 0.0 | | 0.0 | |
| | | | 0.0 | | 0.0 | |
| | | A:B | 35.14 | A:B | 35.14 | A:B 33.32 |

The three SMC formulations had an initial temperature of 98.5° F., 103.2° F., 103.6° F., respectively and a 15 minute temperature of 98.5° F., 116.1° F., 104.7° F., respectively. Viscosity of each of the three SMC formulation was measured over a 7 day period as summarized in Table 5.

TABLE 5

| Various Powder Viscosity Results | | | | | | | |
|---|---|---|---|---|---|---|---|
| Initial Temperature | | | | | 98.5 | 103.2 | 103.6 |
| 15 Minute Temperature | | | | | 98.5 | 116.1 | 104.7 |
| A-Side Water Content (%) | | | | | | | |
| Age | Date | Time | Day # | Paste Temperature | 200909-8710-1 | 200909-8710-2 | 200909-8710-3 |
| A-side | 9/9/20 | | | | | | |
| Initial | 9/9/20 | 3:55 PM | 0.00 | | 12,480 | 12,000 | 21,440 |
| 15 Minute | 9/9/20 | 4:10 PM | 0.01 | | 24,640 | 32,320 | 34,080 |
| Day 1 | 9/10/20 | 11:45 AM | 0.83 | 70.9 | 21,100,000 | 32,500,000 | 39,100,000 |
| Day 2 | 9/11/20 | 11:07 AM | 1.80 | 70 | 32,200,000 | 50,300,000 | 62,600,000 |
| Day 3 | 9/12/20 | | 0.00 | | | | |
| Day 4 | 9/13/20 | | 0.00 | | | | |
| Day 5 | 9/14/20 | 10:43 AM | 4.78 | 71.1 | 64,200,000 | eeee | eeee |
| Day 6 | 9/15/20 | 5:12 PM | 6.05 | 72.5 | 64,200,000 | | |
| Day 7 | 9/16/20 | 10:56 AM | 6.79 | 70.9 | eeee | | |

Table 6 shows the molding performance of the three phenolic powders. The lower mass loss indicates better molding performance.

TABLE 6

| Various Phenolic Powders Molding Performance | | | |
|---|---|---|---|
| # | Charge (g) | Plaque (g) | Mass Loss (%) |
| 200909-8710-1 (Novolac 1) | | | |
| 1 | 209 | 167 | 20.09569378 |
| 2 | 201 | 179 | 10.94527363 |
| 3 | 212 | 185 | 12.73584906 |
| 200909-8710-2 (Novolac 2) | | | |
| 1 | 202 | 186 | 7.920792079 |
| 2 | 191 | 181 | 5.235602094 |
| 3 | 205 | 190 | 7.317073171 |

TABLE 6-continued

| Various Phenolic Powders Molding Performance | | | |
|---|---|---|---|
| # | Charge (g) | Plaque (g) | Mass Loss (%) |
| 200909-8710-1 (Resole Powder) | | | |
| 1 | 188 | 177 | 5.85106383 |
| 2 | 192 | 178 | 7.291666667 |
| 3 | 206 | 193 | 6.310679612 |

References recited herein are indicative of the level of skill in the art to which the invention pertains. These references are hereby incorporated by reference to the same extent as if each individual reference was explicitly and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A method of building viscosity in a sheet molding composition comprising:

mixing into a phenolic resin liquid or solution, a thickening agent of at least one of magnesium oxide, magnesium hydroxide, calcium oxide, calcium hydroxides, zinc oxide, borates, aluminum ion chelates, aluminum trihydrate, polyphosphate, epoxies or combinations thereof, with the proviso that novolac-phenolic resin is present in said phenolic resin liquid or solution, to define an initial viscosity for a mixture; and allowing viscosity of said mixture to build from the initial viscosity such that:

the initial viscosity is between 500 and 50,000 centiPoise (cP) and at 24 hours thereafter builds to between 1 million to 50 million cP, and a terminal viscosity thereafter is between 10 million and 200 million cP, wherein the phenolic resin of the phenolic resin liquid or solution includes novolac-phenolic resin and resol-phenolic resin in a weight ratio of (greater than 1 but less than or equal to 2):1.

2. The method of claim 1 wherein the terminal viscosity is between 10 million and 100 million cP.

3. The method of claim 1 wherein said phenolic resin of the phenolic resin liquid or solution is liquid at 20° C. and standard atmospheric pressure.

4. The method of claim 1 wherein the resol-phenolic resin is provided as a liquid, aqueous solution or alcoholic solution.

5. The method of claim 1 wherein the novolac-phenolic resin has an average molecular weight between 250 and 1200.

6. The method of claim 1 wherein the resol-phenolic resin has an average molecular weight between 200 and 750.

7. The method of claim 1 wherein said thickening agent is magnesium oxide.

8. The method of claim 1 wherein said thickening agent is present from 0.5 to 10 percent by total weight.

9. The method of claim 1 wherein said mixing is mechanical mixing with concurrent heating.

10. The method of claim 1 further comprising dispersing in the mixture at least one of reinforcing fibers, inert filler particles, microspheres, or a low profile additive.

11. The method of claim 1 further comprising curing said phenolic resin into a shape in a mold.

12. The method of claim 11 wherein the mold has a cycle time of from 45 to 180 seconds to form an article.

13. The method of claim 11 wherein the shape defines a vehicle battery box of or portion thereof.

14. The method of claim 11 wherein the shape defines a vehicle component of a firewall barrier, a bumper beam, an automotive door intrusion beam, an automotive door panel component, an automotive hood, an automotive trunk lid, an automotive load floor component, a pick-up box, a railcar component, a HVAC component, electrical component, or an aerospace component.

15. A method of building viscosity in a sheet molding composition comprising:

mixing into a phenolic resin liquid or solution, a thickening agent of at least one of magnesium oxide, magnesium hydroxide, calcium oxide, calcium hydroxides, zinc oxide, borates, aluminum ion chelates, aluminum trihydrate, polyphosphate, epoxies or combinations thereof, with the proviso that novolac-phenolic resin is present in said phenolic resin liquid or solution, to define an initial viscosity for a mixture; and allowing viscosity of said mixture to build from the initial viscosity such that:

said viscosity from the mixing to 36 hours, from 36 to 142 hours, and from 142 hours to 176 hours define a slope ratio of 1.5-8:1:-0.4-2 with a terminal viscosity measured at 176 hours.

16. The method of claim 1, wherein the sheet molding composition includes between two volume percent and 33 volume percent hollow glass microspheres, the hollow glass microspheres having a mean diameter between 10 and 55 microns.

17. The method of claim 15 wherein the phenolic resin of the phenolic resin liquid or solution includes novolac-phenolic resin and resol-phenolic resin.

18. The method of claim 17 wherein the novolac-phenolic resin and the resol-phenolic resin are present in a weight ratio of (greater than 1 but less than or equal to 2):1.

* * * * *